(12) United States Patent
Gong et al.

(10) Patent No.: US 12,316,441 B2
(45) Date of Patent: May 27, 2025

(54) IDENTIFYING AND MONITORING CONNECTIONS IN AN OPTICAL SYSTEM

(71) Applicant: Molex, LLC, Lisle, IL (US)

(72) Inventors: Lifu Gong, San Jose, CA (US); Chao Xiang Shi, Saratoga, CA (US); Bichang Huang, Shenzhen (CN); Frank Liu, Union City, CA (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/370,903

(22) Filed: Sep. 21, 2023

(65) Prior Publication Data

US 2024/0014919 A1 Jan. 11, 2024

Related U.S. Application Data

(62) Division of application No. 17/577,049, filed on Jan. 17, 2022, now Pat. No. 11,863,295.

(30) Foreign Application Priority Data

Jan. 20, 2021 (CN) .......................... 202110075711.5

(51) Int. Cl.
*H04J 14/02* (2006.01)
*H04B 10/077* (2013.01)
*H04B 10/40* (2013.01)
*H04B 10/50* (2013.01)
*H04B 10/60* (2013.01)

(52) U.S. Cl.
CPC ...... *H04J 14/0268* (2013.01); *H04B 10/0771* (2013.01); *H04B 10/0779* (2013.01); *H04J 14/023* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| 5,285,305 | A | * | 2/1994 | Cohen | .................. | H04B 10/077 |
| | | | | | | 398/31 |
| 5,559,624 | A | | 9/1996 | Darcie et al. | | |
| 8,655,167 | B1 | | 2/2014 | Lam et al. | | |
| 2006/0092404 | A1 | * | 5/2006 | Weller | ................... | G01N 21/00 |
| | | | | | | 356/73.1 |
| 2009/0297154 | A1 | | 12/2009 | Izumi | | |

(Continued)

*Primary Examiner* — Darren E Wolf

(57) ABSTRACT

Techniques are provided for identifying and monitoring connections in an optical system. A plurality of optical ports is configured to receive a plurality of optical links that couple with one or more remote optical devices. At least one light source generates identification (ID) signals. At least one optical element configured to direct the ID signals into transmission paths from the source optical device to the remote optical device/s over the plurality of optical links. The remote optical device/s include one or more optical elements that direct the ID signals through a set of WDM filters and returns the ID signals. At least one optical element directs returned ID signals to an optical channel monitor. At least one microprocessor configured to execute control instructions to generate the ID signals and process one or more outputs of the optical channel monitor in response to the returned ID signals to identify the plurality of optical links.

9 Claims, 9 Drawing Sheets

(56) References Cited

U.S. PATENT DOCUMENTS

| | | |
|---|---|---|
| 2011/0013904 A1 | 1/2011 | Khermosh et al. |
| 2012/0134663 A1 | 5/2012 | Wang et al. |
| 2015/0062563 A1 | 3/2015 | Ahadian et al. |
| 2021/0048369 A1 | 2/2021 | Noguchi et al. |

* cited by examiner

IDENTIFYING AND MONITORING CONNECTIONS IN AN OPTICAL SYSTEM

RELATED APPLICATIONS

The present application is a Divisional of U.S. patent application Ser. No. 17/577,049, filed on Jan. 17, 2022, which claims priority to Chinese Patent application No. 202110075711.5 filed on Jan. 20, 2021 both of which are incorporated by reference in their entireties.

TECHNICAL FIELD

The present disclosure generally relates to optical systems, and relates more specifically to the identification and monitoring of connections between optical devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Optical networks are used for many applications, such as communication, measurement, monitoring, energy delivery, and other applications. Optical networks typically offer high-speed voice, video, and data transmission between providers and homes, businesses, and other networks. In an optical network, optical links connect two or more optical devices. An optical link includes a communication medium connected to a device that enables optical communication over the communication medium, such as one or more optical fibers.

The optical link configurations in an optical network may become complex. For example, one optical device may be connected with one or multiple other optical devices, with one or multiple optical links between each optical device pair. Optical devices may be located in different slots of the same optical network device shelf, a different shelf of same network device rack, different locations of same site, and/or different sites. For example, some optical devices may be located remotely from a site controlled by an operator of an optical network, such as to be physically close to a user location. Optical patch panels or optical shuffle boxes may be employed in managing optical connections at a site.

A wavelength-division multiplexing ("WDM") system is often employed in an optical network to handle routing. A WDM system typically multiplexes a number of optical signals with different wavelengths so that multiple distinct signals may travel over a single optical fiber. Because the fiber can simultaneously carry multiple signals, WDM can increase the complexity of optical links at a node of the network when the multiple signals are separated.

Optical links are often physically connected using cables on an ad hoc basis, making cable management and/or mapping difficult. Identification of a connection path, such as during device setup, configuration, and/or reconfiguration, may be a complex task. It may also be challenging to monitor the operation of optical links, such as to detect broken connections and/or degradation.

A typical solution may involve lasers and photodetectors with complicated algorithms in order to identify and/or monitor optical links at a remote site, which may require complex powered electrical circuits and powerful CPU to handle identification, monitoring, and/or communication with network controller. However, a remote optical device may be passive, without electrical circuitry and with no access to electrical power. For example, passive optical devices may appear at remote sites that are geographically distant from a connected site with powered optical device.

SUMMARY

The appended claims may serve as a summary.

Figure 1:
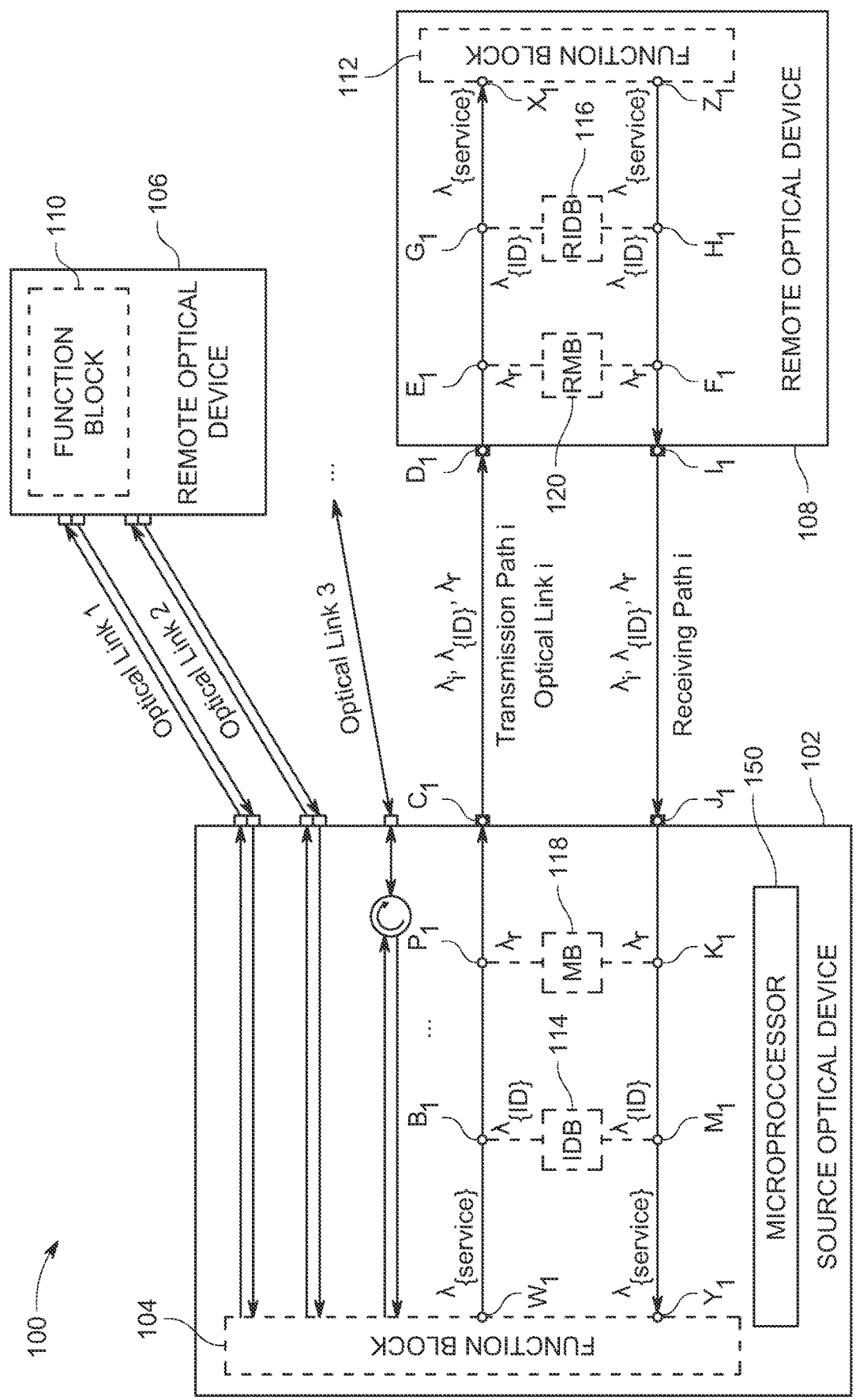
FIG. 1 illustrates an optical system in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures. However, using the particular arrangement illustrated in the one or more other figures is not required in other embodiments.

DETAILED DESCRIPTION

In the following description, numerous specific details are set forth in order to provide a thorough understanding of the present disclosure. It will be apparent, however, that the present disclosure may be practiced without these specific details. The detailed description that follows describes exemplary embodiments and the features disclosed are not intended to be limited to the expressly disclosed combination(s). Therefore, unless otherwise noted, features disclosed herein may be combined to form additional combinations that were not otherwise shown for purposes of brevity.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other, and does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

This document generally describes systems, methods, devices, and other techniques for identifying and monitoring connections in an optical system. An optical system includes one or more source optical devices and one or more remote optical devices that implement an identification mechanism and/or a monitor mechanism.

To implement the identification mechanism, a source optical device includes an identification (ID) block comprising optical elements that perform identification of one or more connections to one or more remote optical devices. The one or more remote optical devices each include a remote ID block comprising one or more optical elements. ID signals generated at the source optical device are transmitted to the one or more remote optical devices, processed by the remote ID block, and transmitted back to the source optical device, where the ID block identifies the one or more connections based on the returned ID signals. The ID signals generated at the source optical device for identification belong to a set of ID wavelengths $\lambda_{\{ID\}}$. In some embodiments, $\lambda_{\{ID\}}$ does not overlap with a set of service wavelengths $\lambda_{\{service\}}$, and the identification mechanism is not used during normal operation of the source optical device and the remote optical device.

To implement the monitor mechanism, a source optical device includes a monitor block comprising optical elements that evaluate connectivity of one or more connections between the source optical device and one or more remote optical devices. The one or more remote optical devices each include a remote monitor block comprising one or more optical elements. Monitor signals generated at the source optical device are transmitted to the one or more remote optical devices, processed by the remote monitor block, and transmitted back to the source optical device, where the monitor block evaluates the connectivity of the one or more connections based on the returned monitor signals. The monitor signals generated at the source optical device may have a reference wavelength $\lambda_r$. In some embodiments, $\lambda_r$ does not overlap with a set of service wavelengths $\lambda_{\{servive\}}$, and the monitoring mechanism is used during normal operation of the source optical device and the remote optical device.

In some embodiments, the remote ID block/s and/or the remote monitor block/s only include passive elements that do not require electronic elements and/or electronic power. In this manner, only purely passive optical circuits are deployed in the remote optical device/s that can be tested using the ID mechanism and/or the monitor mechanism. Additional features and advantages are apparent from the specification and the drawings.

FIG. 1 illustrates an optical system in an example embodiment. The optical system 100 includes an optical network with one or more source optical devices 102 and one or more remote optical devices 106-108. As used herein, the term "optical device" refers to optical equipment with one or more optical ports to communicatively couple the optical device to another device so that optical signals can travel over a communication link between the optical devices. An optical device may be a standalone device, and/or may include two or more optical device components.

The source optical device 102 communicates with the one or more remote optical devices 106-108 via one or more optical links 1-i. A source optical device 102 may be coupled with a particular remote optical device 106-108 by one or multiple optical links. An optical link may include a transmitter, receiver, and cable assembly that can transmit information between two points. An optical link may include unidirectional or bidirectional fibers. For example, optical link 1 includes two fibers used for unidirectional communication, while optical link 3 includes one fiber used for bidirectional communication. As used herein, a fiber within an optical link is referred to as an optical link component. An optical link may include one or more cables that terminate with one or more optical connectors designed to mate with an optical port of an optical device.

The source optical device 102 may be configured to perform one or more functions in conjunction with one or more remote optical devices 106-108. The function/s are carried out by a function block 104 at the source optical device 102 and one or more function blocks 110-112 at the remote optical devices 106-108. As used herein, an optical block, such as function blocks 104 and 110-112, is a set of one or more optical elements that generate and/or process one or more optical signals related to a particular function. In some embodiments, the source optical device 102 is a direction device in an OADM node, and the remote optical devices 106-108 are add-drop group devices in the OADM node.

Function block 104 generates service signals having frequencies selected from a set of service wavelengths $\lambda_{\{service\}}$ that are transmitted to one or more remote optical devices 106-108 over the one or more communication links 1-i. In some embodiments, $\lambda_{\{service\}}$ includes wavelengths in a particular communication band, such as the O-band, E-band, S-band, C-band, L-band, 850-nm-band, U-band, and/or another communication band. A channel refers to an optical signal transmitted at a particular wavelength. As used herein, the term "transmission path" refers to the path of service signals from a function block 104 of a source optical device 102 to a function block 112 of a remote optical device 108. As used herein, the term "receiving path" refers to the path of service signals from a function block 112 of a remote optical device 108 to a function block 104 of a source optical device 102. A transmission path and/or a receiving path may travel over an optical link. Transmission path i carries service signals of a particular service wavelength $\lambda_i$ from $W_1$ to $X_1$ over optical link i. Receiving path i carries service signals of $\lambda_1$ from $Z_1$ to $Y_1$ travel over optical link i.

In some embodiments, the source optical device 102 is configured to identify optical connections at one or more remote optical devices 106-108. For example, the source optical device 102 may determine that signals of a particular wavelength travel over a particular optical link. In some embodiments, the source optical device 102 identifies a plurality of optical connections to a plurality of remote optical devices 106-108. The source optical device 102 may include an identification (ID) block 114 that includes one or more optical elements that identify connections to one or more remote optical devices 106-108. The ID block 114 transmits identification (ID) signals having frequencies selected from a set of wavelengths $\lambda_{\{ID\}}$ to one or more remote optical devices 106-108, such as by directing the ID signals into transmission path i at $B_1$. A remote ID block 116 at a remote optical device 108 processes the ID signals from the ID block 114 and transmits the returned ID signals back to the ID block 114. At the remote optical device 108, ID signals from transmission path i are directed to the remote ID block 116 at $G_1$, and returned ID signals from the remote ID block 116 are directed to the receiving path at $H_1$. The returned ID signals are directed from the transmission path i to the ID block 114 at $M_1$.

The term "identification mechanism" is used herein to refer to the combination of the ID block 114 at the source optical device 102 and the remote ID block 116 at one or more remote optical devices 108 optically connected to the source optical device. The identification mechanism is described in greater detail hereinafter.

Alternatively and/or in addition, the source optical device 102 may be configured to monitor optical connections at one or more remote optical devices 106-108. For example, the source optical device 102 may include a monitor block 118 that includes one or more optical elements that monitor connections between the source optical device 102 and one or more remote optical devices 106-108, such as to evaluate connectivity of optical links. The monitor block 118 transmits monitor signals having one or more reference frequencies of wavelength $\lambda_r$ to one or more remote optical devices 106-108, such as by directing the monitor signals into transmission path i at $P_1$. A remote monitor block 120 at a remote optical device 108 processes the monitor signals from the monitor block 118 and transmits the returned monitor signals back to the monitor block 118. At the remote optical device 108, monitor signals from transmission path i are directed to the remote monitor block 120 at $E_1$, and returned monitor signals from the remote monitor block 120 are directed to the receiving path at $F_1$. The returned monitor signals are directed from the transmission path i to the monitor block 118 at $K_1$.

The source optical device 102 may include one or more microprocessors 150. The microprocessor/s 150 may perform one or more computations required by function block 104, ID block 114, and/or monitor block 118. In some embodiments, the microprocessor/s 150 execute one or more control instructions to carry out one or more control processes. The control instructions may include hard-coded instructions, firmware, and/or software. In some embodiments, the microprocessor/s 150 execute instructions for a ID control process to generate ID signals, and process measurements of returned ID signals to generate output comprising the identity one or more optical links to the remote optical devices 106-108. In some embodiments, the microprocessor/s 150 execute instructions for a monitor control process to generate monitor signals, and process measurements of returned monitor signals to generate output comprising the health one or more connections to one or more remote optical devices 106-108.

The term "monitor mechanism" is used herein to refer to the combination of the monitor block 118 at the source optical device 102 and the remote monitor block 120 at one or more remote optical devices 108 optically connected to the source optical device. The monitor mechanism is described in greater detail hereinafter.

In an optical system, a source optical device 102 and one or more connected remote optical devices 106-108 may implement both the identification mechanism and the monitor mechanism, or may independently implement either the identification mechanism or the monitor mechanism. Different source optical devices in the same optical system may implement none, one, or both of the identification mechanism and/or the monitor mechanism. In some embodiments, the source optical device 102 is a direction device in an optical add-drop multiplexer (OADM) node, and each add-drop group device in the OADM node implements the identification mechanism, the monitor mechanism, or both the identification mechanism and the monitor mechanism.

For ease of illustration, aspects described herein with respect to a particular source optical device, a particular remote optical device, and/or a particular optical link may apply to one or more other source optical devices, remote optical devices and/or optical links. For example, an optical system may include one or multiple source optical devices; a source optical device may communicate with a remote optical device over one or multiple optical links; and/or a source optical device may communicate with one or multiple remote optical devices. Furthermore, the techniques for identification and monitoring may be applied to one optical link, multiple optical links, and/or all optical links from a source optical device. While one or more specific elements may be shown in a particular embodiment, other elements and configurations may provide equivalent functionality without departing from the spirit or the scope of this disclosure.

Figure 2:
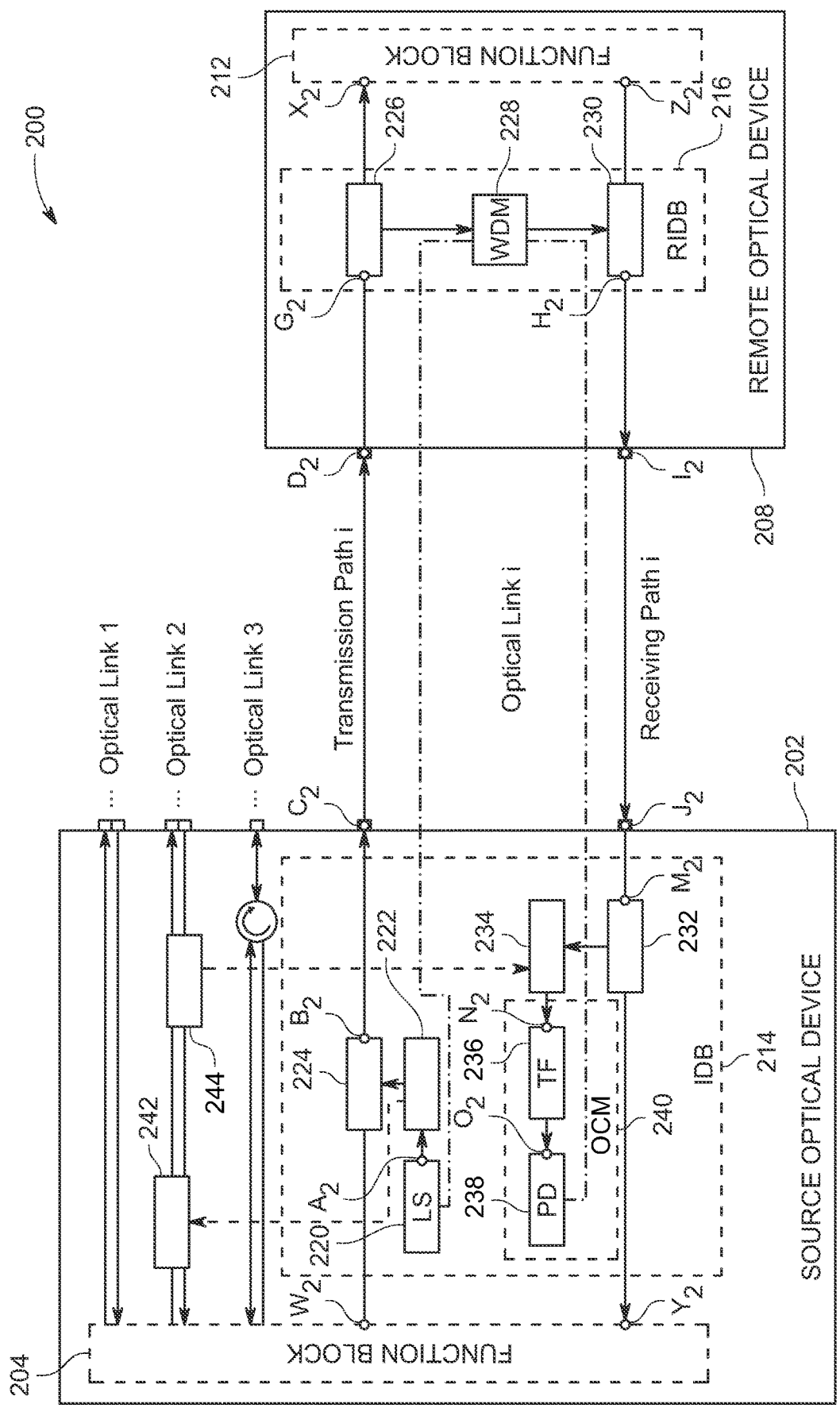
FIG. 2 illustrates an optical system with an ID block in a source optical device and a remote ID block in a remote optical device in an example embodiment.

FIG. 2 illustrates an optical system with an ID block in a source optical device and a remote ID block in a remote optical device in an example embodiment. The optical system 200 includes a source optical device 202 and a remote optical device 208 connected by an optical link i. A transmission path i from $W_2$ to $X_2$ carries service signals from a function block 204 of the source optical device 202 to a function block 212 of the remote optical device 208, and a receiving path i from $Z_2$ to $Y_2$ carries service signals from the function block 212 of the remote optical device 208 to the function block 204 of the source optical device 202 using a particular service wavelength $\lambda$ of a set of service wavelengths $\lambda_{\{service\}}$.

The source optical device 202 includes an ID block 214 that identifies one or more connections at one or more remote optical devices. The remote optical device 208 includes a remote ID block 216. As previously noted, a remote ID block may be present in one or multiple remote optical devices connected to the source optical device 202. Furthermore, multiple remote ID blocks may be present in a remote optical device 208.

The ID block 214 transmits ID signals over transmission path i using a set of ID wavelengths $\lambda_{\{ID\}}$. At $A_2$, a light source 220 generates light of the set of wavelengths $\lambda_{\{ID\}}$. In some embodiments, the light source 220 includes one or more broadband light sources, one or more tunable lasers, one or more diodes such as light-emitting diodes (LEDs) and laser diodes (LDs), and/or one or more other light sources that can provide $\lambda_{\{ID\}}$ light. In some embodiments, the light source 220 is a light source that exists for another purpose in the source optical device 202, such as a light source that belongs to function block 204.

The ID signals are directed into transmission path i at $B_2$ using one or more elements 222-224. For example, element 224 may be a splitter and/or switch, a multiplexer, or another optical element. In some embodiments, the light source 220 generates $\lambda_{\{ID\}}$ light that is directed into transmission paths that travel over one or more other optical links. For example, element 222 may be a switch element and/or splitter element that transmits light to one or more other transmission paths, such as but not limited to a transmission path that travels over optical link 2, using one or more elements 242.

At $G_2$, the ID signals are directed into a bypass path from $G_2$ and $H_2$ by using an element 226 that can direct the ID signals into the bypass path, such as a switch, or another optical element at $G_2$. In some embodiments, the bypass path is only enabled when identification of optical links is performed for the optical system 200. In such cases, element 226 may be a switch without affecting the transmission of service signals during normal operation of function block 204 and function block 212.

The ID signals transmitted over transmission path i enter the bypass path $G_2$-$H_2$ and travel to a set of wavelength-division Multiplexing (WDM) filters 228. Each WDM filter of the set of WDM filters 228 can either pass or block a different wavelength. The set of WDM filters 228 can be used in different combinations. When the set of WDM filters includes a maximum number of different wavelength filters 1, and a maximum number of filters to "build such Optical ID Block" is k (k<=1), the total number of unique identifiers (IDs) that can be created by "such Optical ID Block" will be equal to $C_1^k + C_1^{k-1} + \ldots + C_1^1$. For example, if the set of WDM filters has 400 GHz channel spacing in a typical C band with 4 THz total bandwidth, then the set of WDM filters can have a maximum of 1=10 filters with different wavelength (4 THz/400 GHz). If only one filter is used to build the "Optical block" (k=1), then 10 optical links can be identified. If up to two filters are used to "build the Optical block" (k=2), then 55 optical links can be identified ($C_{10}^2 + C_{10}^1 = 45+10=55$). Based on the maximum connectivity of the source optical device 202, a minimum number of filters needed can be determined to ensure every connection can be uniquely identified among all connections from the source optical device 202 to the remote optical device/s 208.

In some embodiments, the set of WDM filters 228 and/or the remote ID block 216 is a pluggable component in the remote optical device 208. When the set of WDM filters 228 and/or the remote ID block 216 is a pluggable component, the number of WDM filters can be changed, such as to accommodate a greater number of remote optical devices 208 identifiable by the source optical device 202.

Figure 3A:
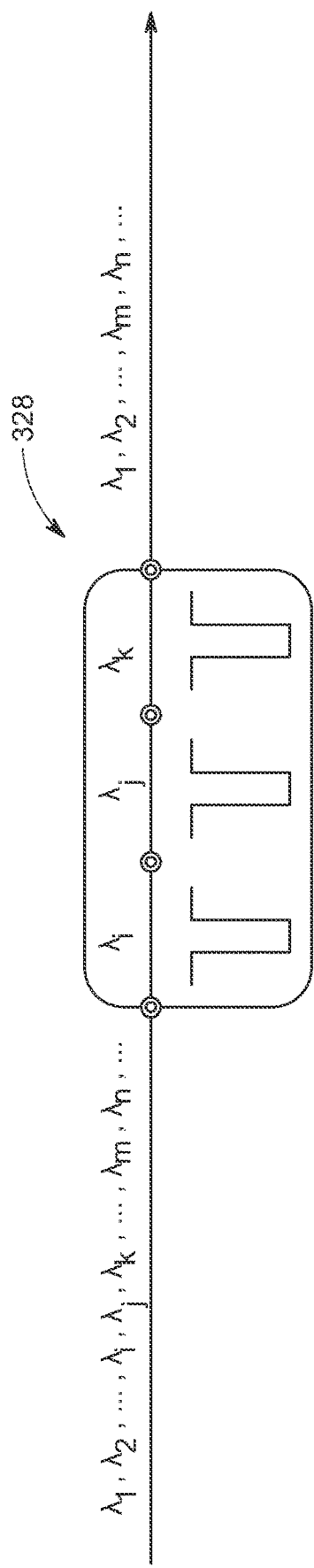
FIGS. 3A-3B illustrate sets of WDM filters in an example embodiment.

FIG. 3A illustrates a configuration for a set of WDM filters (e.g. set of WDM filters 228) in a remote ID block (e.g. remote ID block 216) in an example embodiment. A set of WDM filters 328 in a bypass path (e.g. $G_2$-$H_2$) includes one or multiple optical notch filters which can block signals of different wavelengths ($\lambda_i$, $\lambda_j$, $\lambda_k$). The filters are placed in series, and one or a series of wavelengths will be blocked if light pass through the set of WDM filters 328.

Figure 3B:
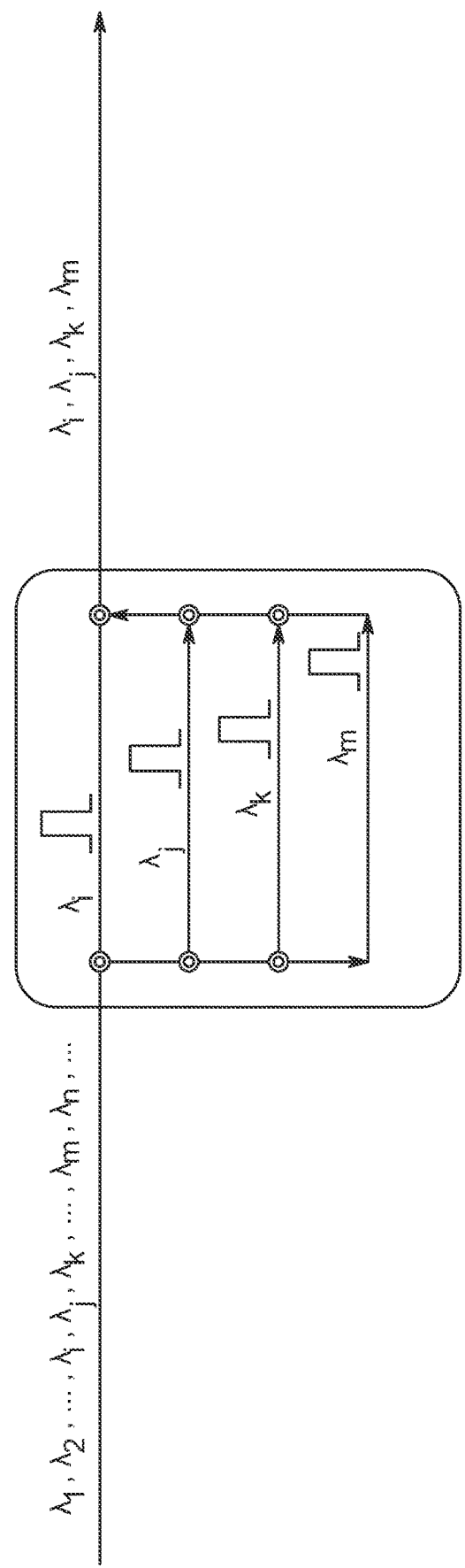

FIG. 3B illustrates a configuration for a set of WDM filters (e.g. set of WDM filters 228) in a remote ID block (e.g. remote ID block 216) in an example embodiment. A set of WDM filters 358 in a bypass path (e.g. $G_2$-$H_2$) includes one or multiple optical band pass filters, which can each pass signals of different wavelengths ($\lambda_i$, $\lambda_j$, $\lambda_k$, $\lambda_m$). The filters are cascaded together, and one or a series of wavelengths will be passed while rest will be blocked if light pass through this block.

Returning to FIG. 2, the ID signal is directed into the receiving path i at $H_2$. At $M_2$, one or more elements 232-234, such as one or more splitters, filters, demultiplexers, and/or other optical modules, direct the returned ID signals from the receiving path i to a set of one or more elements 236-238 of an optical channel monitor (OCM) 240. The OCM 240 measures properties of returned ID signals, such as the wavelength of a particular received signal. In some embodiments, the OCM 240 includes a tunable filter 236 and a photodetector 238. The tunable filter 236 and photodetector 238 are integrated to perform optical wavelength channel monitoring. The OCM 240 allows the ID block 214 to determine which wavelength(s) of the set of ID wavelengths $\lambda_{\{ID\}}$ have been blocked or passed, allowing the ID block 214 to uniquely identify optical link i. The light generated by the light source 220 passes through the path $A_2$-$B_2$-$C_2$-$D_2$-$G_2$-$H_2$-$I_2$-$J_2$-$M_2$-$N_2$-$O_2$.

In order to perform identification, light returning from the receiving path (e.g. receiving path i) of an optical link is directed through a channel monitor (e.g. OCM 240). The source optical device 202 may have one or multiple OCMs to test a set of optical link/s (e.g. optical link i) with remote ID block/s (e.g. remote ID block 216). In some embodiments, the OCM 240 is shared between two or more receiving paths such that returned ID signals returning over one or more other optical links are also directed to the OCM 240. For example, element 244, such as a splitter element and/or a filter element, directs light from a receiving path that travel over optical link 2 to the OCM 240. In some embodiments, one OCM 240 is shared between all testable optical links with remote ID blocks. Alternatively and/or in addition, one or more additional OCM elements may be present in one or more connections to other remote ID blocks. The source optical device 202 may include electronic circuitry that uses the output of the OCM 240 to perform identification. In some embodiments, the ID block 214 may identify a wavelength associated with one or more optical links, one or more ports associated with a particular wavelength, or other identification information.

In some embodiments, each connection between the source optical device 202 and a remote optical device 208 includes a remote monitor block and a monitor block, which may include shared elements. In some embodiments, the ID block may include 214 electrical circuitry, and/or may share electrical circuitry and/or resources used by other functionality (e.g. function block 204) of the source optical device 202. In some embodiments, the source optical device 202 includes one or more microprocessors (e.g. microprocessor 150) that executes one or more control instructions to carry out one or more identification control processes as described herein. In some embodiments, the remote ID block 216 is a passive optical block that includes only passive optical elements.

In some embodiments, the set of ID signal wavelengths $\lambda_{\{ID\}}$ may overlap with the set of service signal wavelengths $\lambda_{\{service\}}$, and the identification mechanism does not operate during normal operation of the optical system 200. For example, the identification mechanism described herein may be used during installation, modification, testing, and/or provisioning of the source optical device 202 and the remote optical device/s 208. In some embodiments, $\lambda_{\{ID\}}$ does not overlap with $\lambda_{\{service\}}$. When there is no conflict or overlap between the ID wavelengths $\lambda_{\{ID\}}$ and the service wavelengths $\lambda_{\{service\}}$, the identification mechanism may be used during normal operation of the source optical device 202 and the remote optical device/s 208.

Figure 4:
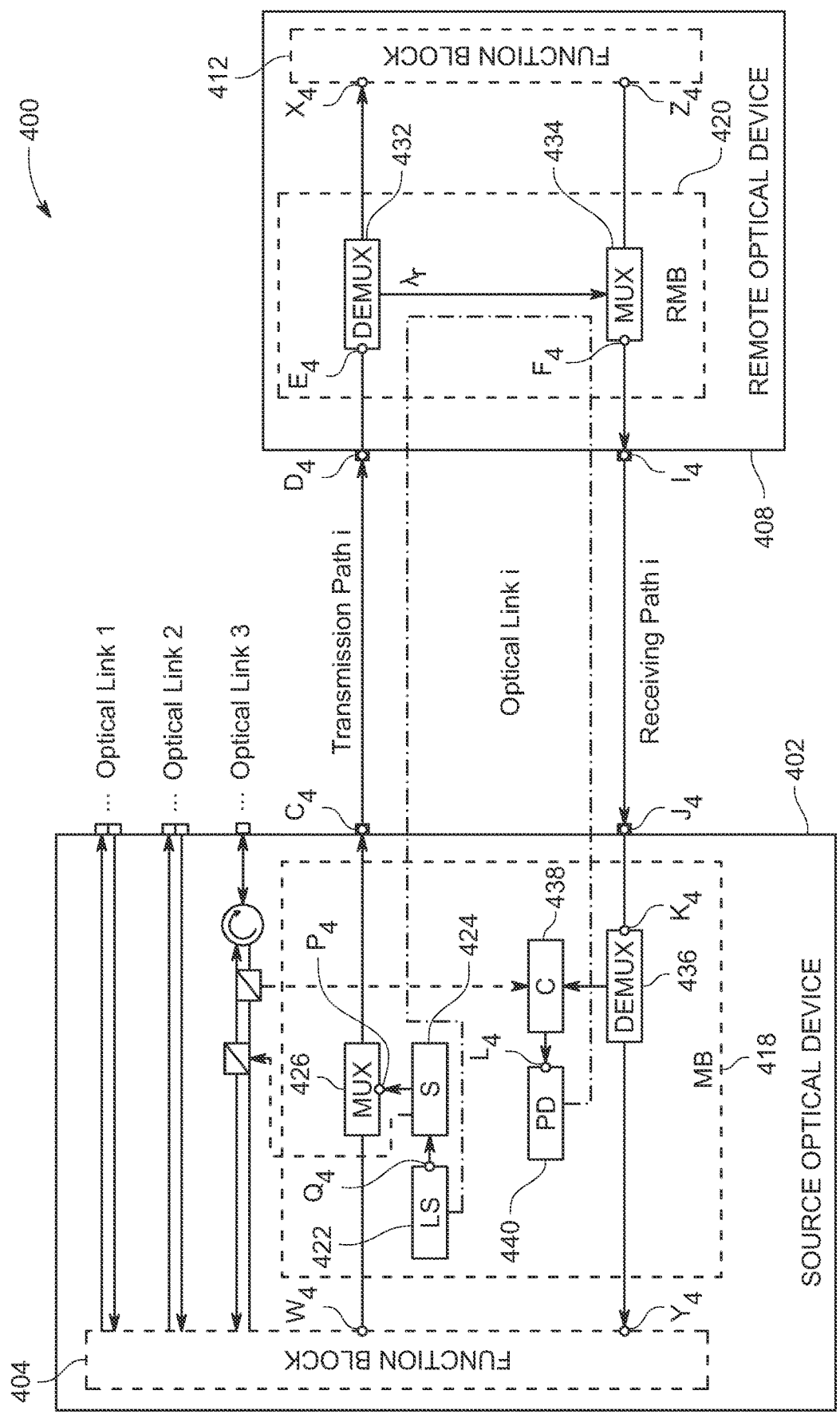
FIG. 4 illustrates an optical system with a monitor block in a source optical device and a remote monitor block in a remote optical device in an example embodiment.

FIG. 4 illustrates an optical system with a monitor block in a source optical device and a remote monitor block in a remote optical device in an example embodiment. The optical system 400 includes a source optical device 402 and a remote optical device 408 connected by an optical link i. A transmission path i from $W_4$ to $X_4$ carries service signals from a function block 404 of the source optical device 402 to a function block 412 of the remote optical device 408 over optical link i using light of a particular service wavelength L of a set of service wavelengths $\lambda_{\{service\}}$. A receiving path i from $Z_4$ to $Y_4$ carries service signals from the function block 412 to the source optical device 402 using $\lambda$ light.

The source optical device 402 includes a monitor block 418 that monitors one or more connections between the source optical device 402 and one or more remote optical devices 408. The remote optical device 408 includes a remote monitor block 420 that is communicatively coupled with the monitor block 418. As previously noted, a remote monitor block 420 may be present in one or multiple remote optical devices connected to the source optical device 402. Furthermore, multiple remote monitor blocks may be present in a remote optical device 408.

The monitor block 418 transmits monitor signals over transmission path i using monitor signals of a reference wavelength $\lambda_r$. The monitor signals are directed into transmission path i at $P_4$. For example, a light source 422 at $Q_4$ may generate the monitor signal. In some embodiments, the light source 422 includes one or more broadband light sources, one or more tunable lasers, one or more diodes such as light-emitting diodes (LEDs) and laser diodes (LDs), and/or one or more other light sources that can provide light of the reference wavelength $\lambda_r$. In some embodiments, the light source 422 is a light source that exists for another purpose in the source optical device 402, such as a light source that belongs to function block 404. In some embodiments, multiple reference wavelengths and/or dynamically-selected reference wavelengths are used.

In some embodiments, the light source 422 generates $\lambda_r$ light that is directed into transmission paths that travel over one or more other optical links. For example, element 424 may be a switch element and/or splitter element that transmits light to one or more other transmission paths, such as but not limited to a transmission path that travels over optical link 3, using one or more elements.

The monitor signal is added into the transmission path i corresponding to optical link i at $P_4$ using one or more elements 426. For example, element 426 may be a multiplexer (MUX) element that combines a service signal from the function block 404 with the monitor signal from the light source 422. The monitor signal travels over a path $Q_4$-$P_4$-$C_4$-$D_4$-$E_4$-$F_4$-$I_4$-$J_4$-$K_4$-$L_4$.

At $E_4$, the monitor signals are directed into a bypass path from $E_4$ to $F_4$, such as by using element 432. For example, the bypath path may be set up using WDM techniques, such as by using an optical demultiplexer (DEMUX) element 432 at $E_4$ and a MUX element 434 at $F_4$. The DEMUX element 432 separates $\lambda_r$ monitor signals at $E_4$ so that they are not received at the function block 412 of the remote optical device 408. The MUX element 434 adds the $\lambda_r$ monitor signals of wavelength $\lambda_r$ to the receiving path i at $F_4$ so that they return to the source optical device 402 for processing.

At $K_4$, one or more optical elements 436-438 direct the monitor signal from the receiving path i to a photodetector 440. For example, a DEMUX element 436 may separate $\lambda_r$ monitor signals wavelength at $K_4$ and direct them to the photodetector 440. The redirected monitor signals are not received at the function block 404 of the source optical device 402. Alternatively, other elements may be used to direct the monitor signal from the receiving path i to a photodetector 440. The photodetector 440 evaluates returned monitor signal from the remote optical device 408. For example, the photodetector 440 may be used to detect a power of the returned monitor signal, such as to determine an optical loss on the path $C_4$-$D_4$-$E_4$-$F_4$-$I_4$-$J_4$. Based on the configuration of the remote monitor block 420, it may be assumed in one or more embodiments that the optical loss between $D_4$ and $I_4$ is negligible. The connectivity and/or health of the optical link i can be compared and continuously monitored. For example, the optical loss $C_4$-$D_4$ and $I_4$-$J_4$ may be compared with baseline data at factory calibration and/or provisioning. The monitoring mechanism may detect a severe fiber broken event or loss degradation issue during normal operation of the source optical device 402 and the remote optical device 408.

In some embodiments, the photodetector 440 is shared between two or more optical links such that monitor signals from one or more other receiving paths are also directed to the same photodetector 440. For example, an element 438, such as but not limited to an optical coupler or switch element, may direct light from a receiving path of optical link 3 to the photodetector 440. In some embodiments, one photodetector 440 is shared between all monitored optical links with remote ID blocks. Alternatively and/or in addition, one or more additional photodetector elements may be present in one or more connections to other remote monitor blocks.

In some embodiments, each connection between the source optical device 402 and a remote optical device includes a remote monitor block and a monitor block, which may include shared elements. In some embodiments, the monitor block 418 may include electrical circuitry, and/or may share electrical circuitry and/or resources used by other functionality (e.g. function block 404) of the source optical device 402. In some embodiments, the source optical device 402 includes one or more microprocessors (e.g. microprocessor 150) that executes one or more control instructions to carry out one or more monitor control processes as described herein. In some embodiments, the remote monitor block 420 is a passive optical block that includes only passive optical elements.

In some embodiments, the monitor mechanism operates during normal operation of the optical system 400, and the reference wavelength $\lambda_r$ of the monitor signals does not overlap with the wavelengths $\lambda_{\{service\}}$ of the service signals. For example, $\lambda_r$ may be outside of a frequency band selected for the service signals. In some embodiments, more than one reference wavelength is used.

Figure 5:
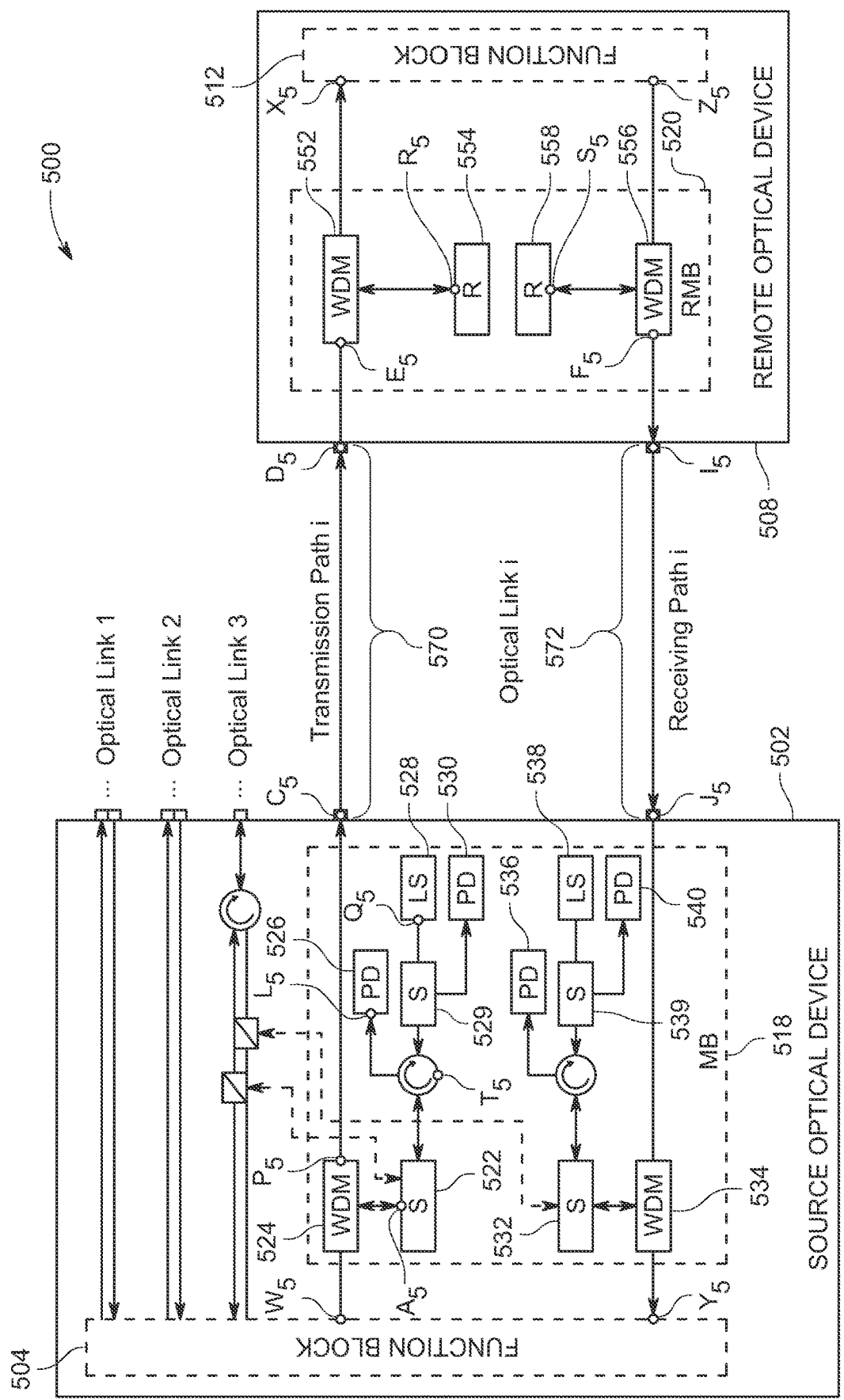
FIG. 5 illustrates an optical system with a monitor block for a source optical device and a remote monitor block for a remote optical device in an example embodiment.

In some embodiments, a source optical device is configured to independently monitor connectivity and health of a first link component 570 used by a transmission path and a second link component 572 used by a receiving path. FIG. 5 illustrates an optical system with a monitor block for a source optical device and a remote monitor block for a remote optical device in an example embodiment. The optical system 500 includes a source optical device 502 and a remote optical device 508 connected by an optical link i. A transmission path i from $W_5$ to $X_5$ carries service signals from function block 504 of the source optical device 502 to the function block 512 of the remote optical device 508. From $C_5$ to $D_5$, transmission path i travels over a first link component 570 of optical link i, such as a first optical fiber. A receiving path i from $Z_5$ to $Y_5$ carries service signals from the function block 512 to function block 504. From $I_5$ to $J_5$, the transmission path i travels over a second link component 572 of optical link i, such as a second optical fiber. The service signals have a particular service wavelength $\lambda$ of a set of service wavelengths $\lambda_{\{service\}}$.

The source optical device 502 includes a monitor block 518. One or more remote monitor blocks 520 may be present in one or multiple optical devices connected to the source optical device 502. The monitor block 518 transmits monitor signals of a reference wavelength $\lambda_r$ over one or more optical link components to be monitored. A first circuit including monitor block elements 522-530 and remote monitor block elements 552-554 is configured to monitor transmission path i, and a second circuit including monitor block elements 532-540 and remote monitor block elements 556-558 is configured to monitor receiving path i. In some embodiments, the first circuit and the second circuit operate in the same or similar fashion using elements that perform the same or similar functionality with respect to transmission path i and receiving path i. The first circuit is described in greater detail hereinafter.

In a first circuit associated with transmission path i, a light source 528 generates the $\lambda_r$ monitor signals. The monitor signals are directed into transmission path i corresponding at $P_5$ using one or more elements. For example, a WDM element 524 may comprise a MUX element that adds the $\lambda_r$ monitor signal to the $\lambda_i$ service signal. In some embodiments, the light source 528 includes one or more broadband light sources, one or more tunable lasers, one or more diodes such as light-emitting diodes (LEDs) and laser diodes (LDs), and/or one or more other light sources that can provide $\lambda_r$ light. In some embodiments, the light source 528 is a light source that exists for another purpose in the source optical device 502, such as a light source that belongs to function block 504. In some embodiments, the light source 528 generates monitor signals that are directed into the transmission path of one or more other optical links. For example, element 522 may be a switch element and/or splitter element that transmits light to one or more other transmission paths, such as but not limited to a transmission path that travels over optical link 3.

In the remote monitor block 520 at the remote optical device 508, the monitor signal enters a bypass path at $E_5$ using one or more elements. For example, a WDM element 552 may comprise a DEMUX element that separates the $\lambda_r$ monitor signals at $E_5$ so that they are not received at function block 512. The WDM element 552 directs the $\lambda_r$ monitor signals to $R_5$. At $R_5$, a reflector 554 reflects the $\lambda_r$ monitor signal. The $\lambda$ monitor signal travels back to the WDM element 552, which may comprise a MUX element that directs the reflected monitor signal back to the source optical device 502. Although transmission path i is illustrated with arrows indicating a direction of the service signals from $W_5$ to $X_5$, the transmission path i allows bidirectional signaling, allowing the reflected monitor signal to travel from the reflector 554 at $R_5$ to the WDM element 524 at $P_5$. The reflected monitor signal travels to a photodetector 526 at $L_5$. For example, a circulator at $T_5$ may direct outgoing monitor signals from the light source 528 to the WDM 524 via element 522, and may direct incoming reflected monitor signals to the photodetector 526. In some embodiments, a DEMUX element of the WDM element 524 at $P_5$ separates the returned monitor signals of wavelength $\lambda_r$ so that they do not travel to function block 504.

The photodetector 526 detects a power of the reflected monitor signal, such as to determine an optical loss over its path from the light source 528 to the photodetector 526, $Q_5$-$T_5$-$A_5$-$P_5$-$C_5$-$D_5$-$E_5$-$R_5$-$E_5$-$D_5$-$C_5$-$P_5$-$A_5$-$T_5$-$L_5$. The source optical device 502 may have one or multiple photodetectors 526 to evaluate reflected monitor signals. In some embodiments, the photodetector 526 is shared between two or more optical links such that reflected monitor signals from one or more other receiving paths are also directed to the same photodetector 526. Alternatively and/or in addition, photodetector elements may be present in one or more other optical links. Based on the configuration of the monitor block 518 and the remote monitor block 520, it may be assumed in one or more embodiments that the optical loss on segments outside of the first link component 570 is negligible. The connectivity and/or health of the first link component 570 can be compared and continuously monitored. For example, the optical measurements detected by the photodetector 526 may be compared with baseline data at factory calibration and/or provisioning to determine optical loss. The monitoring mechanism may detect a fiber disconnection or failure event or loss degradation issue in the first link component 570 during normal operation of the source optical device 502 and the remote optical device 508.

In some embodiments, the first circuit associated with transmission path i has additional components to improve health and connectivity monitoring. For example, a photodetector 530 may be used to monitor the health of the light source 528. Light travels from the light source 528 to the photodetector 530 without traveling over any optical links. For example, light may travel from the light source 528 to the photodetector 530 via an element 529, such as but not limited to an optical splitter or switch element that directs light away from the path $Q_5$-$T_5$ to the photodetector 530. The photodetector 530 may determine a current output of the light source 528 and compare the current output of the light source to the baseline data at factory calibration to determine a health of the light source 528. In some embodiments, the optical measurements detected by the photodetector 526 are compared to the current output of the light source as detected by the photodetector 530 to determine optical loss over transmission path i.

In some embodiments, each connection between the source optical device 502 and a remote optical device includes a remote monitor block and a monitor block, which may include shared elements.

In some embodiments, the monitor mechanism operates during normal operation of the optical system 500, and the reference wavelength $\lambda_r$ does not overlap with the wavelengths $\lambda_{\{service\}}$ of the service signals. For example, $\lambda_r$ may be outside of a frequency band selected for the service signals. In some embodiments, more than one reference wavelength is used.

In some embodiments, the monitor mechanism operates during normal operation of the optical system 500, and the wavelength $\lambda_r$ of the monitor signals does not overlap with the wavelengths $\lambda_{\{service\}}$ of the service signals. For example, the reference wavelength $\lambda_r$ may be outside of a frequency band selected for the service signals. In some embodiments, more than one reference wavelength is used.

In some embodiments, the monitor block 518 may include electrical circuitry, and/or may share electrical circuitry and/or resources used by other functionality (e.g. function block 504) of the source optical device 502. In some embodiments, the source optical device 502 includes one or more microprocessors (e.g. microprocessor 150) that executes one or more control instructions to carry out one or more monitor control processes as described herein. In some embodiments, the remote monitor block 520 is a passive optical block that includes only passive optical elements.

An optical add-drop multiplexer (OADM) is an optical device used in wavelength-division multiplexing (WDM) systems for multiplexing and routing different wavelengths of light into or out of a single fiber. This allows multiple communication channels with different wavelengths to travel over a fiber. An OADM device generally includes an optical demultiplexer (DEMUX), an optical multiplexer (MUX), a method of reconfiguring the paths between the optical demultiplexer and the optical multiplexer, as well as a set of ports for adding and dropping signals. OADMs are often used in telecommunications networks. An OADM may refer to both a fixed optical add-drop multiplexer (FOADM) and/or a reconfigurable optical add-drop multiplexer (ROADM).

Figure 6:
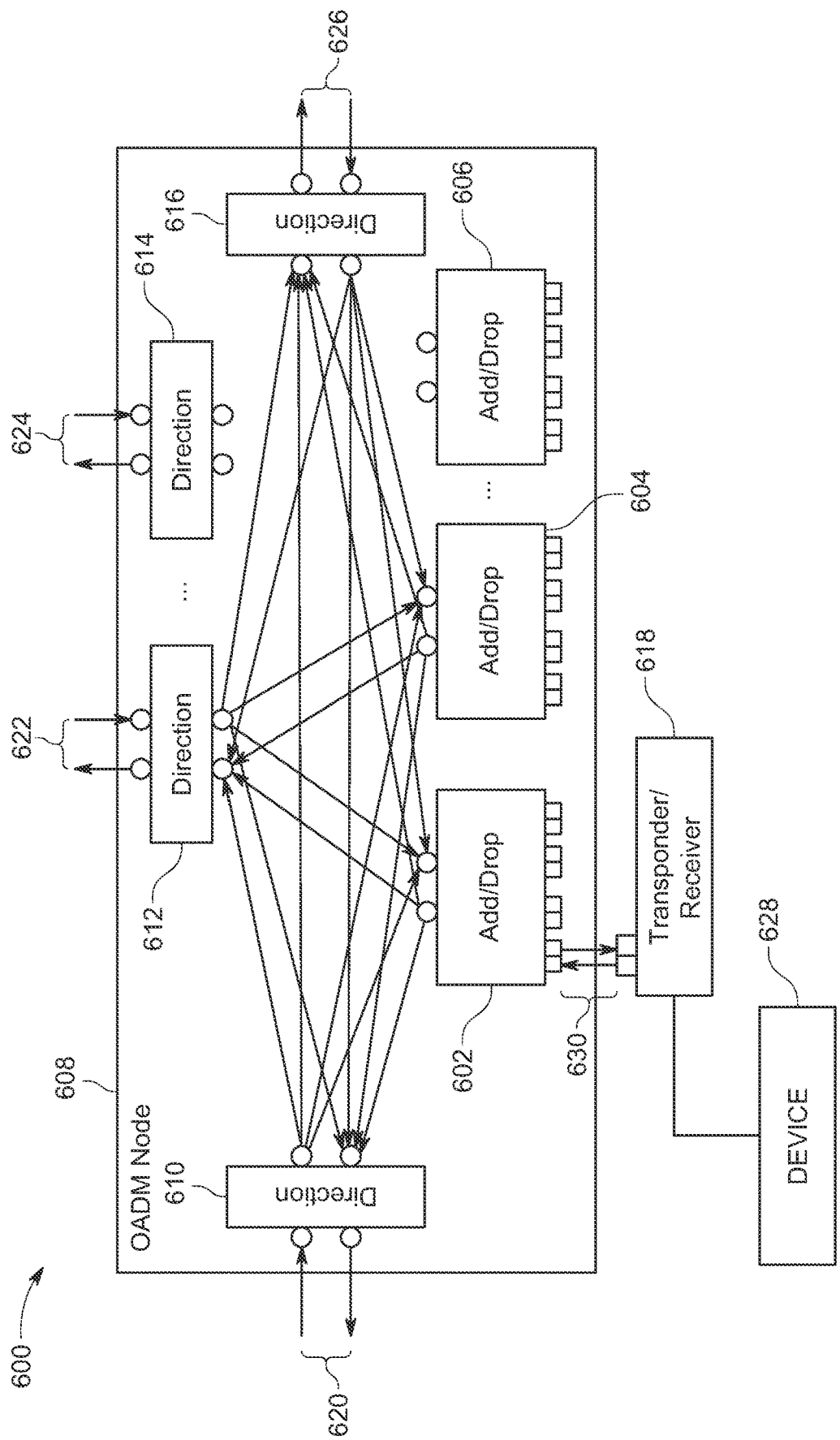
FIG. 6 illustrates an optical system with an optical add-drop multiplexer (OADM) node in an example embodiment.

FIG. 6 illustrates an optical system with an OADM node in an example embodiment. The optical system 600 includes a plurality of OADM nodes including OADM node 608. The OADM node 608 is coupled to a plurality of other nodes in the optical system 600 by at least one inter-node optical link 620-626. An inter-node optical link 620-626 includes at least one optical fiber for transmission of multiple wavelength signals in a unidirectional and/or bidirectional manner to and from the OADM node 608. Typically, one or more OADM nodes 608 are arranged in a bus, ring, star, mesh, or hybrid topology arrangement. An OADM node 608 may be a terminal node in the optical system 600, such as when the OADM node 608 is connected to only one inter-node optical link 620-626.

The OADM node 608 includes at least one direction device 610-616. A direction device 610-616 routes signals received over a corresponding inter-node optical link 620-626 to other components within the OADM node 608, such as but not limited to one or more add-drop group devices 602-606 and/or one or more other direction devices 610-616. For example, the OADM node 608 may include one or more express communication links that directly transmit and receive service signals between direction devices 610-616 without adding or dropping any channels.

A direction device 610 may be coupled to one or more add-drop group devices 602-606 with one or more optical links. An add-drop group device 602-606 may perform add-drop functionality for signals a different set of wavelengths. For example, a particular direction device 610 may communicate signals with a first set of wavelengths with a first add-drop group device 602, signals with a second set of wavelengths with a second add-drop group device 604, and signals with a third set of wavelengths with a third add-drop group device 606. In some embodiments, the signals assigned to a particular add-drop group device 60 are a sub-band of band of frequencies used by the optical system 600. In some embodiments, an OADM node 608 only has one add-drop group device 602, and a direction device 610-616 transmits the entire band of service signals to the single add-drop group device 602.

An add-drop group device 602-606 separates and combines individual channels of particular wavelengths in the received service signals. For example, an add-drop group device 602 may drop or separate signals of wavelength $\lambda_x$, transmit the $\lambda_x$ signals to a device 628 over an optical link 630 coupling the device 628 and the add-drop group device 602-606, receive $\lambda_x$ signals from the device 628 over the optical link 630, and add the received $\lambda_x$ signals to a combined outgoing signal comprising outgoing signals of multiple wavelengths from one or more other devices. The device 628 may be an optical device, electrical device, and/or electro-optical device. One or more transponders, receivers, transceivers, and/or other optical-electrical and electrical-optical devices may be employed to communicate with the device 628.

The add-drop group device 602 may drop and add signals of a plurality of wavelengths (such as but not limited to $\lambda_x$) and may communicate individual wavelength signals with a plurality of devices (such as but not limited to device 628). The add-drop group device 602 transmits the combined signal comprising multiple channels assigned to the add-drop group device 602 to one or more direction devices 610-616.

Although the OADM node 608 is illustrated as a logical device, the components of the OADM node 608 may be deployed separately. Add-drop group devices 602-606 are often physically deployed separately and independently from direction devices 610-616. For example, one or more add-drop group devices 602-606 may be located in different slots of the same optical network device shelf as one or more direction devices 610-616, one or more different shelves of same network device rack, one or more different locations at the same site, and/or remotely from a site comprising one or more direction devices 610-616. In some embodiments, one or more add-drop group devices 602-606 are located close to a location of one or more end-users. In some embodiments, one or more optical links between an add-drop group device 602-606 and a direction device 610-616 go through one or more optical cabling systems, such as but not limited to one or more optical patch panels and/or optical shuffle boxes.

The direction devices 610-616 may be well equipped with powered electrical elements, such as light sources (such as photodiodes, laser diodes, and/or other light sources) and/or optical channel monitors (OCMs). Furthermore, the direction devices 610-616 may be closely linked a to powered optical network device and/or network controllers, making their optical connectivity simpler to identify and/or monitor during provisioning and/or operation. Alternatively, one or more add-drop group devices 602-606 may have complex connection paths to the direction devices 610-616 and/or other devices in the OADM node 608. Furthermore, one or more add-drop group devices 602-606 may be passive, having no electrical circuitry and no powered optical element.

Figure 7:
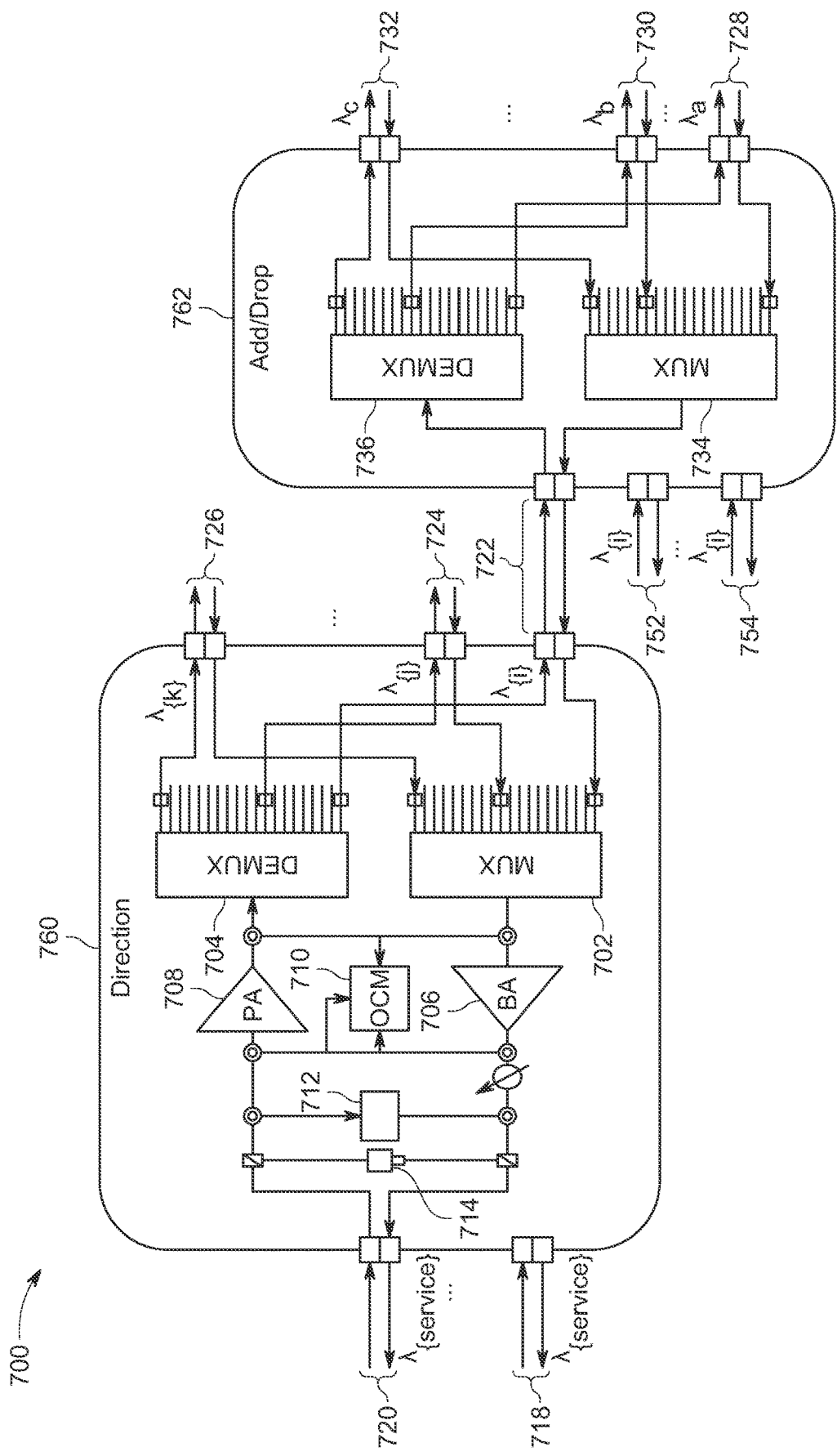
FIG. 7 illustrates a direction device and an add-drop group device in an OADM node in an example embodiment.

FIG. 7 illustrates a direction device and an add-drop group device in an OADM node in an example embodiment. An OADM node 700 includes one or more direction devices 760 and one or more add-drop group devices 762. The direction device may transmit and receive signals over one or more optical links 718-720 with one or more other direction devices (e.g. direction devices 610-616). For clarity in explanation, one direction device 760 and one add-drop group device 762 are described in greater detail hereinafter; one or more described features may apply to one or more other direction devices and/or add-drop group devices within the OADM node 700. In some embodiments, one or more direction devices 760 are source optical devices (e.g. source optical device 102, 202, 402, 502) that include one or more identification blocks and/or one or more monitor blocks. In some embodiments, one or more add-drop group devices 762 are remote optical devices (e.g. remote optical device 108, 208, 408, 508) that include one or more remote identification blocks and/or one or more remote monitor blocks. Specific examples are described in FIGS. 8-9 without limiting the disclosure to the example embodiments.

A direction device 760 may include a DEMUX element 704 to separate signals so that a particular sub-band assigned to a particular add-drop group device 762 can be directed to the particular add-drop group device 762. The DEMUX element 704 separates service signals of a set of wavelengths $\lambda_{\{service\}}$ received over communication link 720 into one or more signal subsets and transmits the separated signals to one or more corresponding add-drop group devices 762 over one or more optical links 722-726. For example, signals of wavelengths $\lambda_{\{i\}}$ are directed from DEMUX element 704 to add-drop group device 762 over communication link 722; signals of wavelengths $\lambda_{\{j\}}$ are directed from DEMUX element 704 to another add-drop group device over communication link 724; and signals of wavelengths $\lambda_{\{k\}}$ are directed from DEMUX element 704 to another add-drop group device over communication link 726.

The direction device 760 may include a MUX element 702 to combine signals from one or more add-drop group devices (e.g. add-drop group devices 602-606) so that the combined signals can be transmitted to one or more direction devices (e.g. direction devices 610-616) over one or more communication links 718-720. For example, the MUX element 702 may combine returned $\lambda_{\{i\}}$ signals from add-drop group device 762 over communication link 722; returned $\lambda_{\{j\}}$ signals from another add-drop group device over communication link 724; and returned $\lambda_{\{k\}}$ signals from another add-drop group device over communication link 726.

A direction device 760 may include one or more powered electrical and/or optical elements, such as a pre-amplifier 708, an optical channel monitor 710, a booster amplifier 706, a photodiode 712, an optical supervisory channel 714, a variable optical attenuator, a light source, a power source, electronic circuitry, a processor, and/or other elements, including powered elements, that can be used by an ID block (e.g. ID block 114, 214) and/or a monitor block (e.g. monitor block 118, 418, 518) in one or more embodiments.

In the add-drop group device 762, the DEMUX element 736 separates signals based on wavelength and directs the separated signals to a plurality of single-wavelength optical links 728-732. Each single-wavelength optical link 728-732 may carry signals of a particular wavelength (e.g. $\lambda_a, \lambda_b, \lambda_c$) between the add-drop group device 762 and a device (e.g. device 628). The MUX element 734 combines returned signals received over the single-wavelength optical links 728-732 so that the combined returned signals can be transmitted to the direction device 760 over communication link 722.

An add-drop group device 762 may be connected to one or multiple direction devices 760. For example, add-drop group device 762 may be connected to one or more other direction devices (e.g. direction devices 610-616) by one or more optical links 752-754. For example, add-drop group device 762 may also receive $\lambda_{\{i\}}$ signals from other direction devices over optical links 752-754. In some embodiments, signals from two or more direction devices may be directed to the MUX element 734 and the DEMUX element 736 in an add-drop group device 762. Alternatively and/or in addition, signals from a direction device may have its own MUX element 734 and DEMUX element 736. For example, the combined signals may also be transmitted from MUX element 734 to one or more other direction devices over communication links 752-754.

Figure 8:
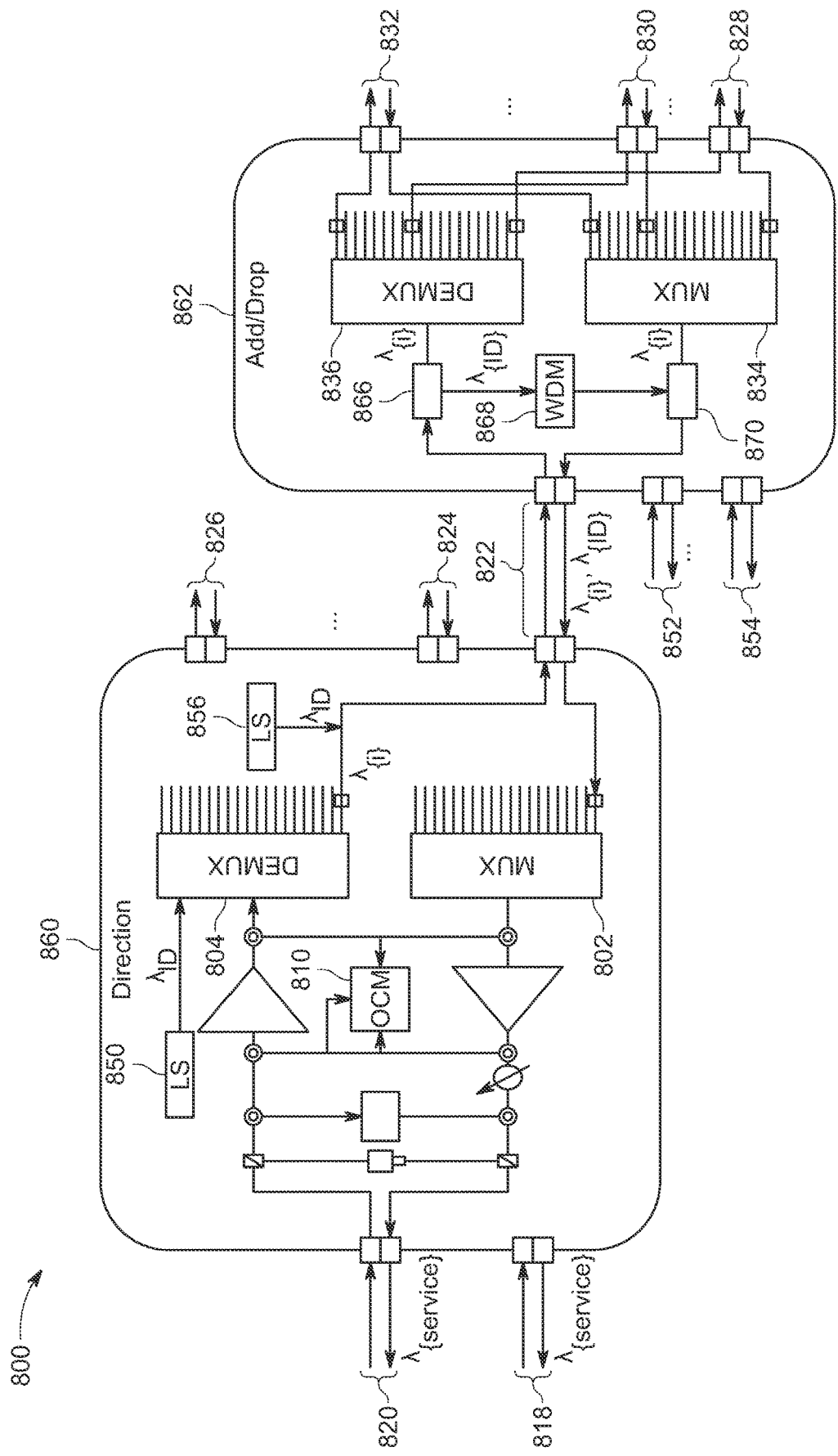
FIG. 8 illustrates a direction device and an add-drop group device in an OADM node that implements an ID mechanism in an example embodiment.

FIG. 8 illustrates a direction device and an add-drop group device in an OADM node that implements an ID mechanism in an example embodiment. An OADM node 800 includes one or more direction devices 860 and one or more add-drop group devices 862. A direction device 860 may transmit and receive signals over one or more optical links 818-820 to/from one or more other direction devices (e.g. direction devices 610-616). For clarity in explanation, one direction device 860 and one add-drop group device 862 are described in greater detail hereinafter; one or more described features may apply to one or more direction devices and/or add-drop group devices within the OADM node 800. In some embodiments, the OADM node 800, one or more direction devices 860 and/or one or more add-drop group devices 862 include one or more elements described with respect to one or more other embodiments described herein.

The direction device 860 includes one or more ID block components, such as a light source 850 upstream of DEMUX element 804 and/or a light source 856 downstream of DEMUX element 804. The DEMUX element 804 separates service signals of a set of wavelengths $\lambda_{\{service\}}$ received over communication link 820 into one or more signal subsets and transmits the separated signals to one or more corresponding add-drop group devices 862 over one or more optical links 822-826.

In the add-drop group device 862, the DEMUX element 836 separates signals based on wavelength and directs the separated signals to a plurality of single-wavelength optical links 828-832, which may couple the add-drop group device 862 to one or more devices. The MUX element 834 combines returned signals received over the single-wavelength optical links 828-832 so that the combined returned signals can be transmitted to the direction device 860 over optical link 822.

The ID signals are added to a transmission path of service signals transmitted from the direction device 860 to the add-drop group device 862. The add-drop group device 862 includes one or more remote ID block components, such as elements 866-870. For example, element 866 may direct the ID signals into a bypass path that includes a set of WDM filters 868, and element 870 may direct the ID signals into a receiving path for returned service signals from the add-drop group device 862 to the direction device 860.

In the direction device 860, the returned ID signals are directed to an optical channel monitor (OCM) 810. The OCM 810 measures properties of returned ID signals, such as the wavelength of a particular returned ID signal. The OCM 810 allows the direction group 860 to determine which wavelength(s) of the set of ID wavelengths $\lambda_{\{ID\}}$ have been blocked or passed, allowing identification of a corresponding optical link 822. In some embodiments, the OCM 810 receives the returned ID signals after a MUX element 802 combines received signals from one or more add-drop group devices 862 over one or more optical links 822-826.

An add-drop group device 862 may be connected to one or multiple direction devices 860. For example, add-drop group device 862 may be connected to one or more other direction devices (e.g. direction devices 610-616) by one or more optical links 852-854. The add-drop group device 862 may also receive ID signal and/or service signals from other direction devices over optical links 852-854.

In the add-drop group device 862, the bypass path with the set of WDM filters may be present in each connection path between each direction device and each add-drop group device. For example, ID signals from optical links 852-854 may pass through elements 866-870, or may pass through one or more similar set of elements. Furthermore, the bypass path/s for each direction device of the OADM node 800 may be present in one or more other add-drop group devices of the OADM node 800.

In some embodiments, the direction device 860 includes one or more microprocessors (e.g. microprocessor 150) that executes one or more control instructions to carry out one or more identification control processes as described herein. In some embodiments, the add-drop group device 862 is a passive optical device that includes only passive optical elements.

Figure 9:
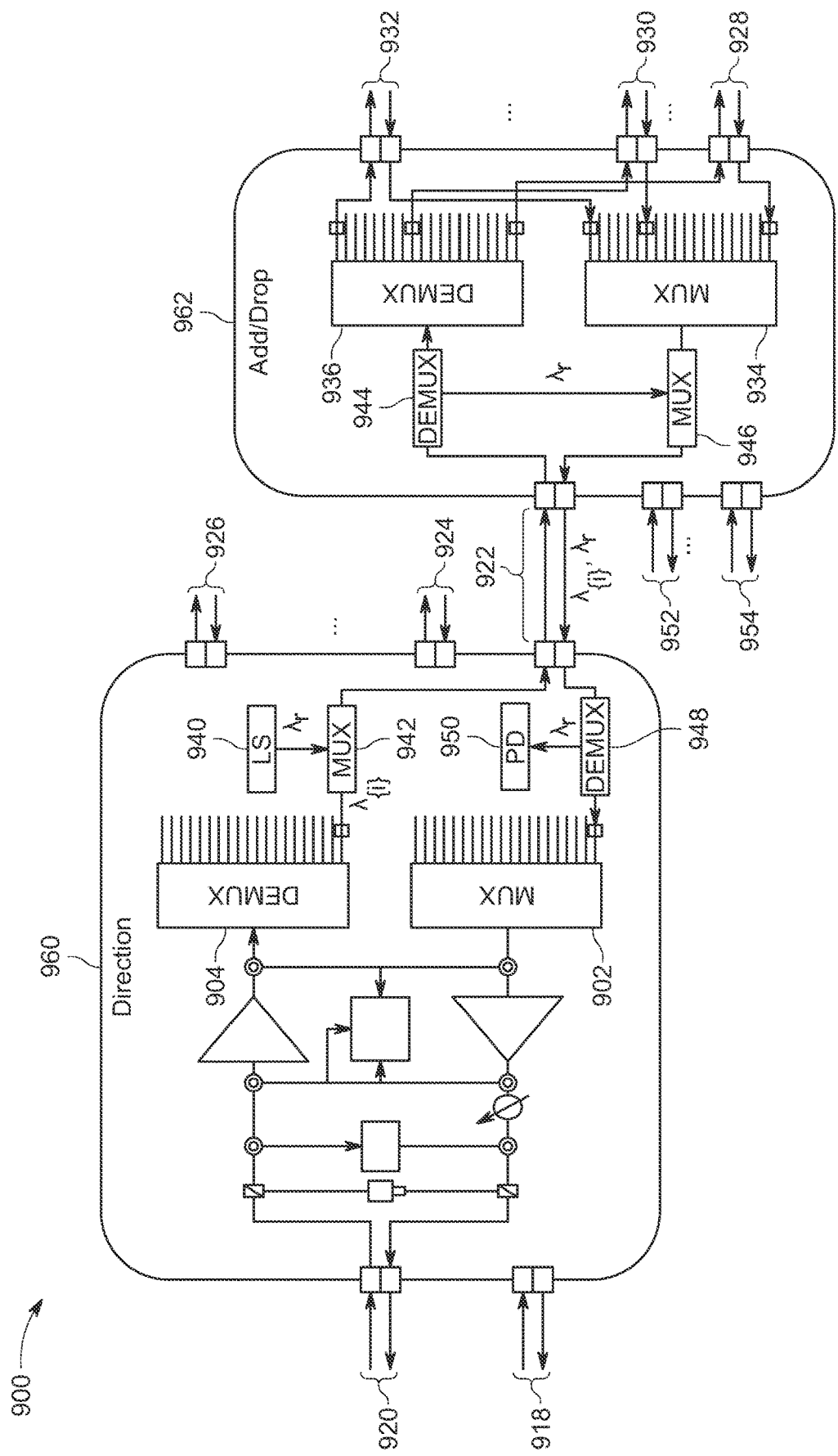
FIG. 9 illustrates a direction device and an add-drop group device in an OADM node that implements a monitor mechanism in an example embodiment.

FIG. 9 illustrates a direction device and an add-drop group device in an OADM node that implements a monitor mechanism in an example embodiment. An OADM node 900 includes one or more direction devices 960 and one or more add-drop group devices 962. A direction device 960 may transmit and receive signals over one or more optical links 918-920 to/from one or more other direction devices (e.g. direction devices 610-616). For clarity in explanation, one direction device 960 and one add-drop group device 962 are described in greater detail hereinafter; one or more described features may apply to one or more other direction devices and/or add-drop group devices within the OADM node 900. In some embodiments, the OADM node 900, one or more direction devices 960, and/or one or more add-drop group devices 962 include one or more elements described with respect to one or more other embodiments described herein.

The direction device 960 includes one or more monitor block components, such as a light source 940 for generating monitor signals of a reference wavelength $\lambda_r$. A MUX element 942 may add the $\lambda_r$ monitor signals to one or more service signals, such as a $\lambda_{\{i\}}$ service signals having wavelengths in a set of wavelengths assigned to a particular add-drop group device 962. The monitor signals added are transmitted from the direction device 960 to the add-drop group device 962 over optical link 922. A same or similar mechanism may add reference signals to services signals transmitted to one or more other add-drop group devices over one or more other optical links 924-926.

The add-drop group device 962 includes one or more remote monitor block components, such as elements 944-946. For example, element 944 may direct the monitor signals into a bypass path, such as by using a DEMUX element 944 to drop the $\lambda_r$ monitor signals from a transmission path from the direction device 960 and a MUX element 946 to add the $\lambda_r$ monitor signals to a receiving path to the direction device 960. The remaining service signal is processed by the add-drop group device 962, such as by DEMUX element 936 and MUX element 934 to separate signals transmitted to optical links 928-932 and combine signals received from optical links 928-932.

At the direction device 960, the returned $\lambda_r$ monitor signals are evaluated. For example, a DEMUX element 948 may separate $\lambda_r$ monitor signals from the receiving path and direct them to a photodetector 950. The photodetector 950 evaluates returned monitor signal from add-drop group device 962. For example, the photodetector 950 may be used to detect a power of the returned monitor signal, such as to determine an optical loss over optical link 922.

An add-drop group device 962 may be connected to one or multiple direction devices 960. For example, add-drop group device 962 may be connected to one or more other direction devices (e.g. direction devices 610-616) by one or more optical links 952-954. The add-drop group device 962 may also receive monitor signal and/or service signals from other direction devices over optical links 952-954.

In the add-drop group device 962, the bypass path may be present in each connection path between each direction device and each add-drop group device. For example, monitor signals from optical links 952-954 may pass through elements 944-946, or may pass through one or more similar set of elements. Furthermore, the bypass path/s for each direction device of the OADM node 900 may be present in one or more other add-drop group devices of the OADM node 900.

In some embodiments, the direction device 960 includes one or more microprocessors (e.g. microprocessor 150) that executes one or more control instructions to carry out one or more monitor control processes as described herein. In some embodiments, the add-drop group device 962 is a passive optical device that includes only passive optical elements.

The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

In the foregoing specification, embodiments are described with reference to specific details that may vary from implementation to implementation. Nevertheless, it will be understood that various modifications may be made without departing from the spirit and scope of the disclosure. The examples set forth above are provided to those of ordinary skill in the art as a complete disclosure and description of how to make and use the embodiments, and are not intended to limit the scope of what the inventor/inventors regard as their disclosure. Modifications of the above-described modes for carrying out the methods and systems herein disclosed that are obvious to persons of skill in the art are intended to be within the scope of the present disclosure and the following claims. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A source optical device comprising:
    a plurality of optical ports configured to receive a plurality of optical links that couple with one or more remote optical devices;
    a light source that generates monitor signals of a reference wavelength;
    at least one sending optical element configured to direct the monitor signals into transmission paths from the source optical device to the one or more remote optical devices over the plurality of optical links, wherein the one or more remote optical devices include one or more remote optical elements that return the monitor signals to the source optical device over a corresponding optical link of the plurality of optical links;
    a photodetector;
    at least one receiving optical element configured to direct returned monitor signals received over the plurality of optical links to the photodetector;
    at least one microprocessor configured to execute control instructions to generate the monitor signals and process one or more outputs of the photodetector in response to the returned monitor signals to determine connectivity of the plurality of optical links; and
    an identification mechanism configured to generate outgoing identification (ID) signals and receive returned ID signals that allow identification of the plurality of optical links,
    wherein:
        the light source generates the outgoing ID signals as a set of ID wavelengths;
        the at least one microprocessor is configured to identify the plurality of optical links based on the returned ID signals; and
        the one or more remote optical elements direct the outgoing ID signals through a set of wavelength division multiplexer (WDM) filters and returns the outgoing ID signals as the returned ID signals to the source optical device over a corresponding optical link of the plurality of optical links.

2. The source optical device of claim 1, wherein the one or more remote optical devices are passive optical devices.

3. The source optical device of claim 1, wherein determining connectivity of the plurality of optical links comprises detecting a fiber disconnection or failure event on one or more optical links.

4. The source optical device of claim 1, wherein determining connectivity of the plurality of optical links comprises determining optical loss over one or more optical links based on baseline data for the light source.

5. The source optical device of claim 1:
    wherein the at least one receiving optical element that return the monitor signals comprise a demultiplexer device in each transmission path from the source optical device and a multiplexer device in each receiving path to the source optical device;

wherein the demultiplexer device and the multiplexer device direct the monitor signals through a bypass path between each transmission path and each receiving path.

6. The source optical device of claim 1:

wherein the one or more remote optical elements at the one or more remote optical devices include a reflector that returns the monitor signals over one or more transmission optical link components used by one or more transmission paths;

wherein the at least one microprocessor is configured to determine connectivity of the one or more remote optical devices.

7. The source optical device of claim 1, further comprising:

at least one additional sending optical element configured to direct second monitor signals of the reference wavelength to the one or more remote optical devices over one or more optical link components used by one or more receiving paths;

wherein the one or more remote optical devices include a second reflector that returns the second monitor signals over the one or more optical link components used by the one or more receiving paths;

at least one additional receiving optical element configured to direct returned second monitor signals to a second photodetector;

wherein the at least one microprocessor is configured to evaluate connectivity of receiving optical link components based on an output of the second photodetector in response to the returned second monitor signals.

8. The source optical device of claim 1, further comprising a second photodetector, wherein determining connectivity of the plurality of optical links comprises determining optical loss over one or more optical links based on a current output of the light source as measured by the second photodetector.

9. The source optical device of claim 1, the identification mechanism further comprising at least one optical element configured to direct the outgoing ID signals into transmission paths from the source optical device to the one or more remote optical devices over the plurality of optical links;

an optical channel monitor; and at least one optical element configured to direct the returned ID signals received over the plurality of optical links to the optical channel monitor.

* * * * *